(12) United States Patent
Han et al.

(10) Patent No.: US 8,686,688 B2
(45) Date of Patent: Apr. 1, 2014

(54) PORTABLE CHARGING APPARATUS FOR MOBILE COMMUNICATION TERMINAL, CHARGING METHOD THEREOF, AND CHARGING SYSTEM

(75) Inventors: Ki Wook Han, Seoul (KR); Ik Hyun Cho, Hwaseong-si (KR); Tae Soo Kim, Suwon-si (KR); Tae Seon Kim, Seoul (KR); Shong Uk Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 13/169,399

(22) Filed: Jun. 27, 2011

(65) Prior Publication Data
US 2011/0316472 A1 Dec. 29, 2011

(30) Foreign Application Priority Data
Jun. 29, 2010 (KR) .................. 10-2010-0061992

(51) Int. Cl.
*H01M 10/46* (2006.01)
(52) U.S. Cl.
USPC ........................................ 320/111
(58) Field of Classification Search
USPC ................... 320/103, 107, 111, 114
See application file for complete search history.

(56) References Cited

U.S. PATENT DOCUMENTS

| 8,237,414 | B1* | 8/2012 | Li et al. ................ 320/160 |
| 2009/0128090 | A1 | 5/2009 | Bi |
| 2011/0095722 | A1* | 4/2011 | Chang ................ 320/107 |
| 2012/0266001 | A1* | 10/2012 | Sha et al. ............. 713/300 |

FOREIGN PATENT DOCUMENTS

GB    2 386 005 A    9/2003

OTHER PUBLICATIONS

"Battery charging specification", Remple Terry, XP002676116, Revision 1.1, Apr. 15, 2009.

* cited by examiner

*Primary Examiner* — Edward Tso
(74) *Attorney, Agent, or Firm* — Jefferson IP Law, LLP

(57) ABSTRACT

A portable charging apparatus, charging method and system for charging a battery of a mobile communication terminal are provided. The portable charging apparatus includes a first Universal Serial Bus (USB) interface connected to an external charging device, a second USB interface connected to a mobile communication terminal, and a switch located between data lines for USB communication. The method includes determining whether the portable charging apparatus is connected to the external charging device, switching on the switch when the portable charging apparatus is not connected to the external charging device, and determining whether the portable charging apparatus is connected to the mobile communication terminal, and supplying electric power from an additional battery of the portable charging apparatus to the mobile communication terminal when the portable charging apparatus is connected to the mobile communication terminal.

17 Claims, 5 Drawing Sheets

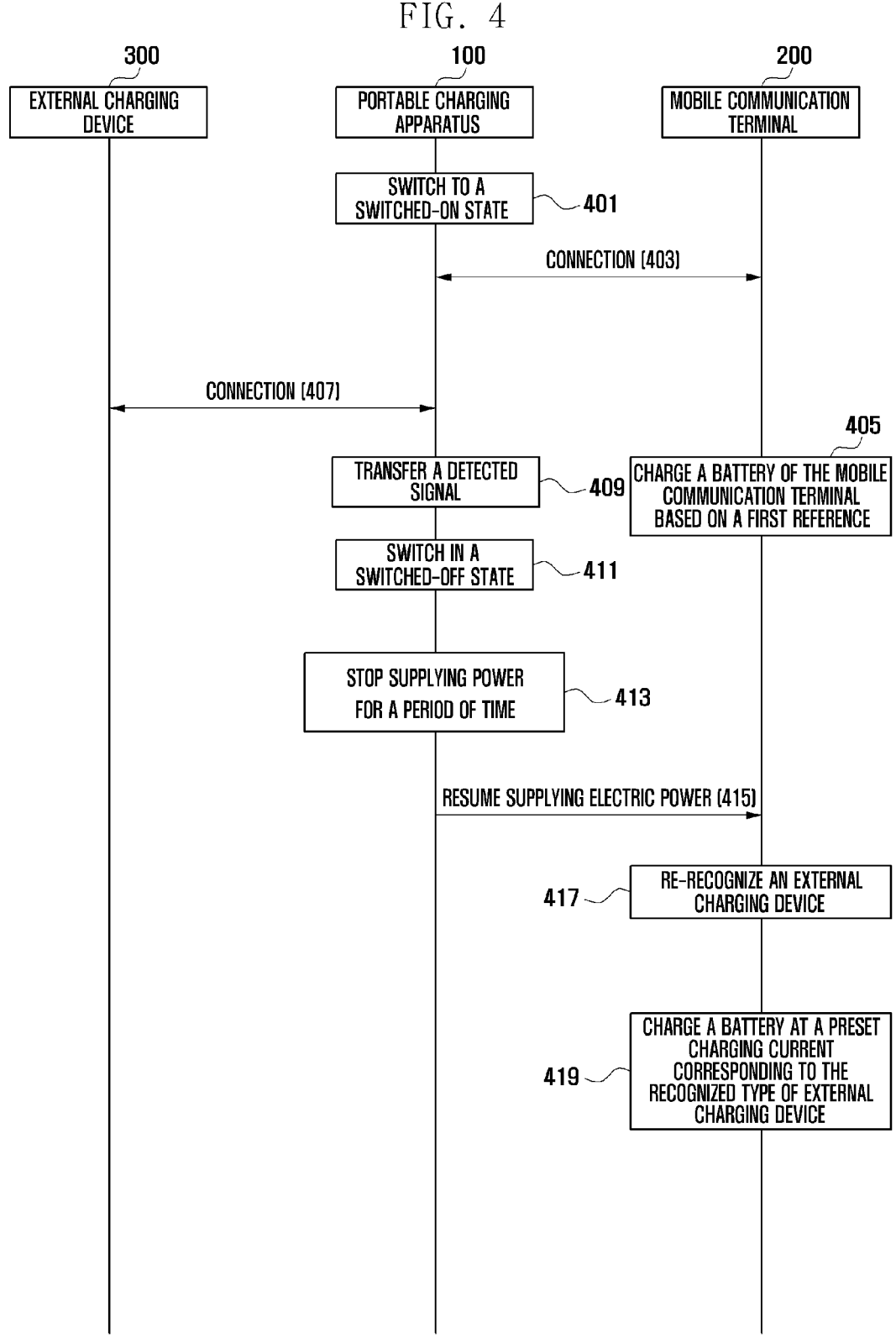

PORTABLE CHARGING APPARATUS FOR MOBILE COMMUNICATION TERMINAL, CHARGING METHOD THEREOF, AND CHARGING SYSTEM

PRIORITY

This application claims the benefit under 35 U.S.C. §119 (a) of a Korean patent application filed on Jun. 29, 2010 in the Korean Intellectual Property Office and assigned Serial No. 10-2010-0061992, the entire disclosure of which is hereby incorporated by reference.

BACKGROUND OF THE INVENTION

1. Field of the Invention

The present invention relates to technology for charging batteries of mobile communication terminals. More particularly, the present invention relates to a charging method and system, and a portable charging apparatus that can prevent a mobile communication terminal from determining that the portable charging apparatus connected to the mobile communication terminal is a Universal Serial Bus (USB) charging device, so that the mobile communication terminal does not enter a sleep mode.

2. Description of the Related Art

With an increase in development of information and communication technology and semiconductor technology, the use of various types of mobile communication terminals has increased. Mobile communication terminals utilize mobile convergence to provide additional service functions provided by other types of mobile communication terminals, as well as their traditional service functions. For example, mobile phones have additional functions as well as their usual communication functions such as a voice call, and message transmission and reception. Examples of the additional functions include a TeleVision (TV) viewing function (e.g., mobile broadcasting, such as Digital Multimedia Broadcasting (DMB), Digital Video Broadcasting (DVB), and the like), an audio playback function (e.g., Moving Pictures Expert Group (MPEG)-1 or MPEG-2 Audio Layer 3 (MP3)), a photographing function, an Internet access function, and the like. As mobile communication terminals provide a variety of functions described above, they face an issue of battery capacity related to their operation time. Since mobile communication terminals are small in size, they are limited in terms of increased battery capacity. In order to address this problem, charging methods have been implemented to employ a portable charging apparatus.

Mobile communication terminals of the related art have been adapted to use charging methods via a travel adapter and/or a Universal Serial Bus (USB) device. The mobile communication terminals of the related art can differentiate between charging modes using a travel adapter and a USB charging device by determining whether two data lines D+ and D− are connected to each other. For example, when a mobile communication terminal detects the connection of an external charging device, it determines whether two data lines D+ and D− are connected to each other. When the mobile communication terminal determines that two data lines D+ and D− are connected to each other, it concludes that it is connected to a travel adapter. On the contrary, when the mobile communication terminal determines that two data lines D+ and D− are not connected to each other, it concludes that it is connected to a USB charging device. Thereafter, the mobile communication terminal controls the charging of the battery.

The mobile communication terminals of the related art cannot identify whether an external charging device connected thereto is a portable charging apparatus. Therefore, when the mobile communication terminals of the related art connect with the portable charging apparatus, they detect that they are connected to a USB charging device and then control a charging process based on the USB charging device. When the mobile communication terminals ascertain that they are connected with a USB charging device instead of the portable charging apparatus, they also cannot enter a sleep mode. In this case, they continue to consume the electric power of their battery. In addition, since a maximum charging current, which will be effective if they had correctly detected that they are connected with the portable charging apparatus, is limited to a maximum current set according to the USB standard, the battery of the mobile communication terminal is charged at a reduced speed.

SUMMARY OF THE INVENTION

Aspects of the present invention are to address at least the above-mentioned problems and/or disadvantages and to provide at least the advantages described below. Accordingly, an aspect of the present invention is to provide a charging method and apparatus that can prevent a mobile communication terminal from ascertaining that a portable charging apparatus connected thereto is a Universal Serial Bus (USB) charging device and accordingly the mobile communication terminal cannot enter a sleep mode and thus continues to consume electric battery power.

Another aspect of the present invention is to provide a charging method and apparatus that allows a mobile communication terminal to re-recognize a type of external charging device when the external charging device is connected to a portable charging apparatus via which the mobile communication terminal is charging the battery.

Another aspect of the present invention is to provide portable charging apparatuses adapted to the charging methods.

In accordance with an aspect of the present invention, a portable charging apparatus is provided. The apparatus includes a first USB interface connected to an external charging device, a second USB interface connected to a mobile communication terminal, an additional battery for supplying electric power to the mobile communication terminal via the second USB interface, a switch, located between data lines of the first USB interface, for connecting or for disconnecting the data lines, an external device sensor for detecting the connection of the external charging device and for transmitting a detected signal of the connection of the external charging device to a control terminal of the switch, wherein the switch is switched off or switched on according to the detected signal, a boost converter for receiving a voltage of the additional battery, for boosting the received voltage to a preset level, and for outputting the boosted voltage, a charging unit for charging the additional battery, an electric power supply switch for supplying electric power or for stopping the supply of the electric power from the external charging device to the mobile communication terminal, and a controller. The controller supplies electric power from the additional battery to the mobile communication terminal by enabling the boost converter when the second USB interface is connected to the mobile communication terminal and the first USB interface is not connected to the external charging device. The controller supplies electric power from the external charging device to the mobile communication terminal when a battery of the mobile communication terminal is not fully charged and the first and second USB interfaces are connected to the external charging device and the mobile communication terminal, respectively. The controller also charges the additional battery via the external charging device by enabling the charging unit when the first USB interface is connected to the external charging device and the second USB interface is not connected to the mobile communication terminal or when the battery of the mobile communication terminal is fully charged and the first and second USB interfaces are connected to the external charging device and the mobile communication terminal, respectively. In addition, the controller comprises a detection terminal to which the detected signal of the connection of the external charging device is input.

In accordance with still another aspect of the present invention, a charging method of a portable charging apparatus includes a first USB interface connected to an external charging device, a second USB interface connected to a mobile communication terminal, and a switch located between data lines for USB communication is provided. The method includes determining whether the portable charging apparatus is connected to the external charging device, switching on the switch when the portable charging apparatus is not connected to the external charging device, and determining whether the portable charging apparatus is connected to the mobile communication terminal, and supplying electric power from an additional battery of the portable charging apparatus to the mobile communication terminal when the portable charging apparatus is connected to the mobile communication terminal.

In accordance with another aspect of the present invention, a charging system is provided. The system includes an external charging device with a USB interface, for supplying electric power to charge a battery, a portable charging apparatus including a first interface connected to the external charging device, a second interface connected to a mobile communication terminal, and a switch for connecting or for disconnecting the data lines according to whether the portable charging apparatus is connected to the external charging device, wherein the switch is disposed between data lines for USB communication, and a mobile communication terminal, connected to the second USB interface, for charging the battery via at least one of the external charging device and the portable charging apparatus.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates a flowchart of a charging method of a charging system, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words used in the following description and claims are not be limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
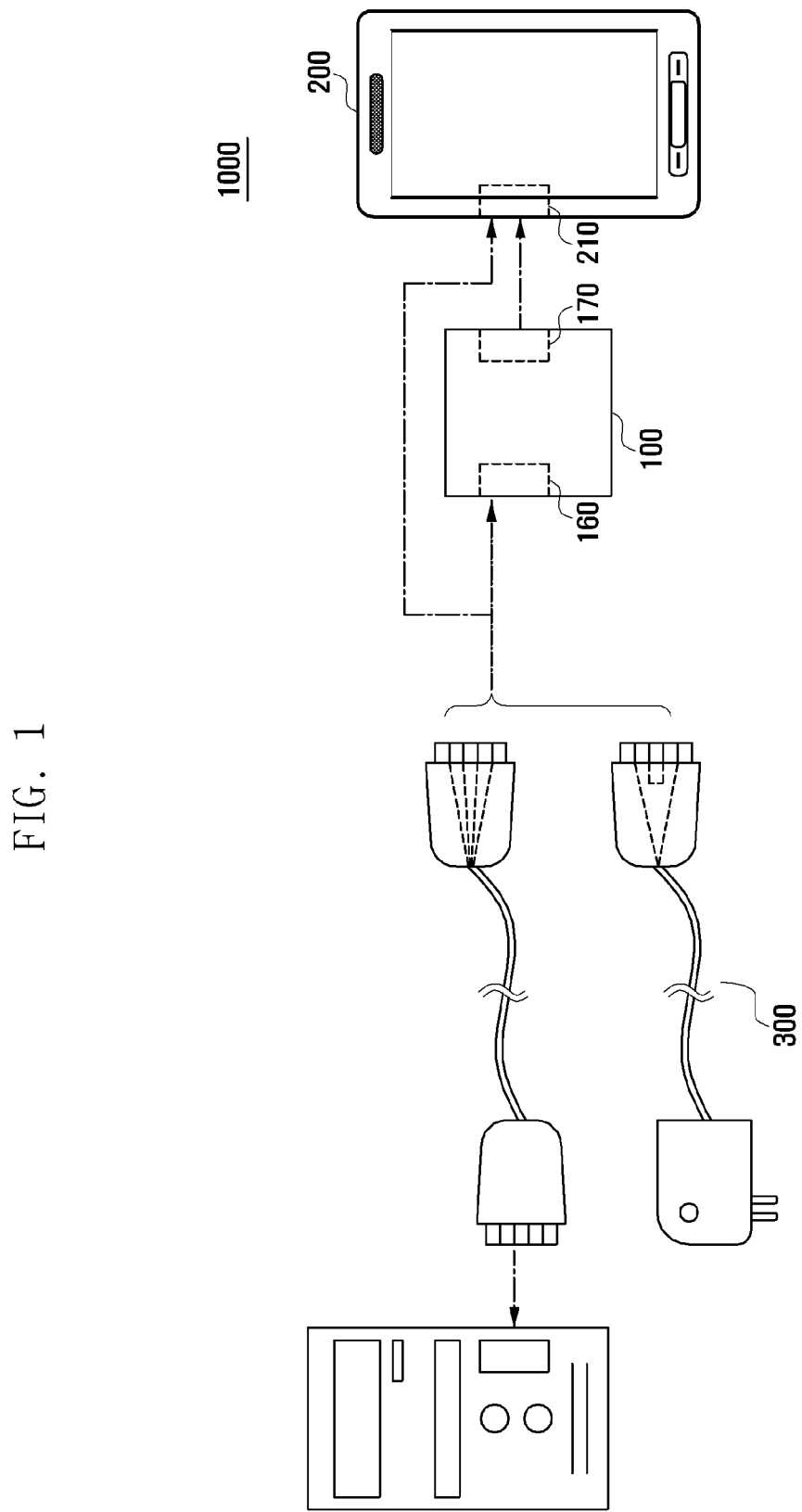
FIG. 1 illustrates a configuration of a charging system according to an exemplary embodiment of the present invention.

FIG. 1 illustrates a configuration of a charging system according to an exemplary embodiment of the present invention.

Referring to FIG. 1, the charging system 1000 includes a mobile communication terminal 200, a portable charging apparatus 100, and an external charging device 300.

The external charging device 300 may be a travel adapter and a Universal Serial Bus (USB) charging device that can be used for electronic systems with a USB port, such as personal computers, laptop computers, and the like. The external charging device 300 can be connected to the portable charging apparatus 100 or the mobile communication terminal 200 via a micro USB interface, for example. The micro USB interface is a device following USB standards and has recently been adopted by small-sized mobile communication systems. The micro USB interface is configured to include one power port, two data ports, and a ground port. Since the micro USB interface is well known to one skilled in the art, a detailed description thereof is omitted.

The USB charging device can be used to perform data communication and charging operation. To this end, the USB charging device has two data lines D+ and D− that are separate. Meanwhile, the travel adapter has two data lines D+ and D− that are connected to each other because the travel adapter does not need to perform data communication with system. Therefore, using the configuration difference between the USB charging device and the travel adapter, the portable charging apparatus 100 and the mobile communication terminal 200 can identify a type of the external charging device 300.

The portable charging apparatus 100 is a type of accessory for the mobile communication terminal 200, and is connected to the mobile communication terminal 200 to supply electric power thereto. The portable charging apparatus 100 can charge an additional battery 130 (illustrated in FIG. 2) therein by electric power supplied from the external charging device 300. In addition, the portable charging apparatus 100 also serves to charge the battery of the mobile communication terminal 200 by transferring electric power from the external charging device 300. That is, when the battery of the mobile communication terminal 200 cannot be charged by the travel adapter or USB charging device, the portable charging apparatus 100 can be used to charge the battery of the mobile communication terminal 200. To this end, the portable charging apparatus 100 includes a first interface 160 to be connected to the travel adapter or USB charging device and a second interface 170 to be connected to the mobile communication terminal 200. In an exemplary embodiment of the present invention, the portable charging apparatus 100 may further include a switch (not illustrated) that is located between two data lines D+ and D− and connects/disconnects the data lines D+ and D− to/from each other according to whether the portable charging apparatus 100 is connected with the external charging device 300.

The portable charging apparatus 100 switches on a switch (not illustrated) to connect two data lines D+ and D− to each other when an external charging device 300 (e.g., a travel adapter and a USB charging device) is not connected to the first interface 160. In addition, the portable charging apparatus 100 switches off the switch (not illustrated) to disconnect two data lines D+ and D− from each other when an external charging device 300 (e.g., a travel adapter and a USB charging device) is connected to the first interface 160. Likewise, when an external charging device 300 (e.g., a travel adapter and a USB charging device) is connected to the first interface 160 while the portable charging apparatus 100 is charging the battery using its additional battery, the portable charging apparatus 100 can temporarily break the electric power supplied to the mobile communication terminal 200 and then resume the electric power supply thereto. This is to allow the mobile communication terminal 200 to newly recognize an external charging device 300. This process will be described in more detail below.

The mobile communication terminal 200 may be applied to various types of electronic systems, such as mobile communication devices, Personal Digital Assistants (PDAs), smart phones, Portable Multimedia Players (PMPs), navigation systems, and the like. The mobile communication terminal 200 includes a mobile communication charging unit (not illustrated) for charging the battery, a mobile communication controller (not illustrated) for controlling the charging process, and a third interface 210 to be connected to the portable charging apparatus 100 or to the external charging device 300. The mobile communication terminal 200 may further include a micro USB interface according to its type. The mobile communication terminal 200 can determine whether it is connected with an external charging device 300 or a portable charging apparatus 100 via an electric power signal therefrom. When the mobile communication terminal 200 determines that it is connected with an external charging device 300 or a portable charging apparatus 100, the mobile communication terminal 200 determines whether two data lines D+ and D− are connected to each other. That is, when the external charging device 300 or the portable charging apparatus 100 is connected to the third interface 210, the mobile communication terminal 200 determines whether two data lines D+ and D− for performing data communication are connected to each other. When the mobile communication terminal 200 determines that two data lines D+ and D− are connected to each other, the mobile communication terminal 200 concludes that it is connected to a travel adapter or a portable charging apparatus 100 and then sets a maximum charging current of the charging unit (not illustrated) to a first reference (e.g., 700 mA). On the contrary, when the mobile communication terminal 200 determines that two data lines D+ and D− are not connected to each other, it concludes that it is connected to a USB charging device and then sets the maximum charging current of the charging unit (not illustrated) to a second reference (e.g., 500 mA). More particularly, when the portable charging apparatus 100 is not connected to an external charging device 300, the switch included in the portable charging apparatus 100 is switched on, and thus the mobile communication terminal 200 can recognize that the portable charging apparatus 100 is a travel adapter. Therefore, the battery (not illustrated) of the mobile communication terminal 200 can be charged based on the first reference that is greater than a value that the battery is charged via a conventional portable charging apparatus, thereby reducing the battery charging time. In addition, a problem in which the mobile communication terminal 200 determines that the portable charging apparatus 100 is a USB device can be prevented so the mobile communication terminal 200 does not enter a sleep mode and continues to consume the battery of the mobile communication terminal 200 and the additional battery of the portable charging apparatus 100.

It should be understood that the first and second references are not limited values described above but may be set according to the manufacturers' designs. The first reference may be set, considering the charging speed and life span of the battery, and the second reference may be set so as not to exceed the maximum current defined in the USB standard, for example, 500 mA.

When the electric power supply to the mobile communication terminal 200 is temporarily stopped and then resumed while the battery is being charged, the mobile communication terminal 200 can re-recognize the type of external charging device 300. This prevents a USB charging device from being overloaded, which occurs when the mobile communication terminal 200 requests more than the maximum current defined in the USB standard, i.e., 500 mA, from the USB charging device when the USB charging device is connected to the first interface 160 of the portable charging apparatus 100 in a state where the mobile communication terminal 200 charges the battery via the portable charging apparatus 100, i.e., where the maximum charging current of the charging unit (not illustrated) is set to the first reference.

Although FIG. 1 shows the exemplary embodiment in such a manner that the second interface 170 of the portable charging apparatus 100 is directly connected to the third interface 210 of the mobile communication terminal 200, it should be understood that the present invention is not limited thereto.

For example, the charging system 1000 of may further include a cable for connecting the second interface 170 and the third interface 210.

Figure 2:
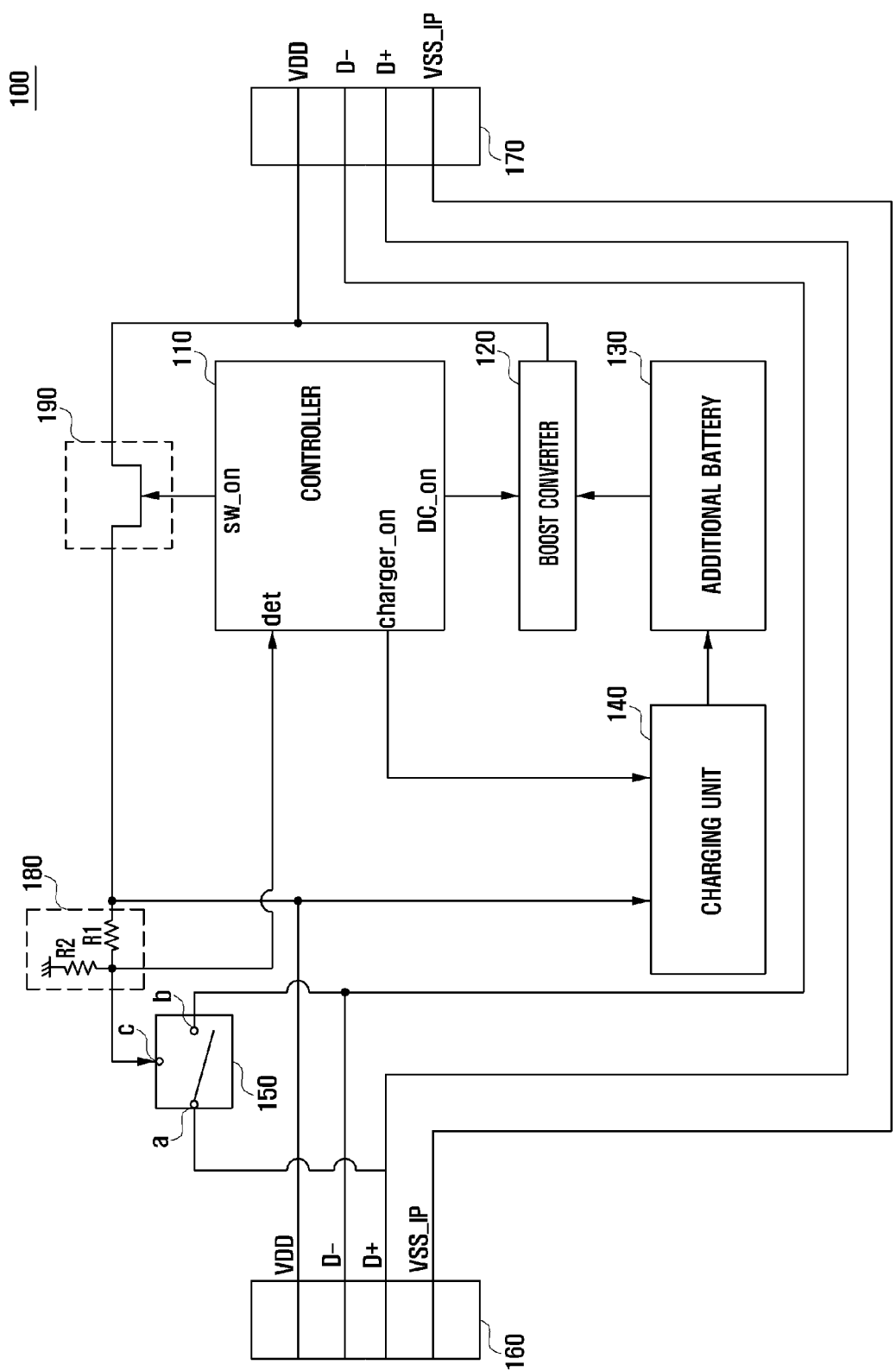
FIG. 2 illustrates a schematic block diagram of a portable charging apparatus according to an exemplary embodiment of the present invention.

FIG. 2 illustrates a schematic block diagram of a portable charging apparatus according to an exemplary embodiment of the present invention.

Referring to FIGS. 1 and 2, the portable charging apparatus 100 includes a controller 110, a boost converter 120, an additional battery 130, a charging unit 140, a switch 150, a first interface 160, a second interface 170, an external device sensor 180, and an electric power supply switch 190.

The first interface 160 is connected to a travel adapter or a USB charging device. The second interface 170 is connected to a mobile communication terminal 200. The first interface 160 and the second interface 170 may be implemented with USB interfaces. In an exemplary implementation, the first interface 160 and the second interface 170 may be implemented with micro USB interfaces suitable for a small sized mobile communication terminal 200. The first interface 160 and second interface 170 each have a power source terminal VDD, two data lines D+ and D−, and a ground terminal VSS_IP.

The external device sensor 180 determines whether an external charging device 300 (e.g., a travel adapter, a USB charging device) is connected to the portable charging apparatus 100. When the external device sensor 180 detects the connection of the external charging device 300, the external device sensor 180 switches off the switch 150. The external charging device 300 includes a first resistor R1 and a second resistor R2 which are connected to each other at one node that is connected to a control terminal c of the switch 150 and a detection terminal det of the controller 110. The opposite end of the first resistor R1 is the power source terminal VDD of the first interface 160. The opposite end of the second resistor R2 is grounded. When the operation voltage of the switch 150 is less than the voltage of an external charging device 300, supplied via the power source terminal VDD of the first interface 160, the first R1 resistor and second resistor R2 divide the voltage of the external charging device 300 into operation voltages for the switch 150 and the controller 110. The resistances of the first resistor R1 and second resistor R2 may be set according to the operation voltages of the switch 150 and the controller 110 and the supply voltage of the external charging device 300. For example, the supply voltage of the external charging device 300 is 5 V and the operation voltages of the switch 150 and the controller 110 are 2.5 V, respectively, and the first R1 and second R2 resistors may have the same resistance. Since the function of the voltage divider using serial resistors is well-known to one skilled in the art, its detailed description will be omitted.

In an exemplary implementation, the first R1 resistor and second resistor R2 may be removed from the system if the operation voltages of the switch 150 and the controller 110 are equal to the supply voltage of the external charging device 300.

The switch 150 performs a switching operation according to signals output from the external device sensor 180, thereby connecting/disconnecting the data lines D+ and D− to/from each other. To this end, the switch 150 connects one end to a positive data line D+ and another end b to a negative data line D−. The switch 150 also connects its control terminal d to the external device sensor 180. When the switch 150 receives a high signal (e.g., 2.5 V) via the control terminal c, the switch 150 is switched off. That is, when the external charging device 300 is connected to the first interface 160 and supplies electric power thereto, the switch 150 is switched off to disconnect the positive data line D+ and the negative data line D−. On the contrary, when the external charging device 300 is not connected to the first interface 160, the switch 150 is switched on and connects the positive data line D+ and the negative data line D−. The portable charging apparatus 100 may further include a pull-down resistor (not illustrated) connected to the control terminal c of the switch 150 in order to prevent the portable charging apparatus 100 from floating when it is not connected to an external charging device 300. As such, when the mobile communication terminal 200 is connected to the portable charging apparatus 100 that is not connected to an external charging device 300, the switch 150 retains a switched-on state. Therefore, the battery (not illustrated) of the mobile communication terminal 200 can be charged based on the first reference that is greater than a value that the battery is charged by via the conventional portable charging apparatus, thereby reducing the battery charging time. In addition, the problem in which the mobile communication terminal 200 recognizes that the portable charging apparatus 100 is a USB device can be prevented so that the mobile communication terminal 200 does not enter a sleep mode and thus continues to consume the battery of the mobile communication terminal 200 and the additional battery 130 of the portable charging apparatus 100.

The charging unit 140 receives electric power that is supplied via the first interface 160 from the external charging device 300 and charges the additional battery 130. That is, the charging unit 140 receives electric power supplied via the first interface 160 connected to a travel adapter or a USB charging device, and charges the additional battery 130. The charging current of the charging unit 140 may be constant regardless of the type of external charging device. Alternatively, the charging current of the charging unit 140 may vary according to the types of external charging devices. For example, when the first interface 160 is connected to a travel adapter, the charging unit 140 charges the additional battery 130, based on the first reference (e.g., 700 mA), under the control of the controller 110. Likewise, when the first interface 160 is connected to a USB charging device, the charging unit 140 charges the additional battery 130, based on the second reference (e.g., 500 mA). It should be understood that the first and second references are not limited to particular values as described above but may be set according to the manufacturers' design. In an exemplary implementation, the second reference may be equal to or less than 500 mA.

The controller 110 controls the operation of the portable charging apparatus 100 and the flow of signals between the components in the portable charging apparatus 100. When the controller 110 determines that the first interface 160 is connected to an external charging device 300, the controller 110 turns on the electric power supply switch 190. To this end, the controller 110 includes a detection terminal det for detecting the connection of an external charging device 300 and a first control terminal SW_ON for switching on/off the electric power supply switch 190. The detection terminal det serves as an interrupt terminal.

When the portable charging apparatus 100 without being connected to the mobile communication terminal 200 is connected to an external charging device 300 or the battery (not illustrated) of the mobile communication terminal 200 is fully charged, the controller 110 can activate the charging unit 140 and then charge the additional battery 130. When the charging current of the charging unit 140 is set to be altered according to a type of external charging device 300, the controller 110 can recognize the type of external charging device 300 by determining whether the positive data line D+ and the negative data line D− are connected to each other. To this end, the controller 110 further includes positive and negative terminals (not illustrated) to be connected to the positive and negative data line D+ and D− respectively. When the controller 110 determines that the positive and negative data line D+ and D− are connected to each other, the controller 110 concludes that the portable charging apparatus 100 is connected to a travel adapter. On the contrary, when the controller 110 determines that the positive and negative data line D+ and D− are not connected to each other, the controller 110 concludes that the portable charging apparatus 100 is connected to a USB charging device. When the controller 110 concludes that the portable charging apparatus 100 is connected to a travel adapter, the controller 110 controls the charging unit 140 so that the maximum charging current of the charging unit 140 is a first reference. In addition, when the controller 110 concludes that the portable charging apparatus 100 is connected to a USB charging device, the controller 110 controls the charging unit 140 so that the maximum charging current of the charging unit 140 is a second reference. To this end, the controller 110 further includes a charge control terminal charger_on for outputting a control signal to control the charging unit 140.

When the second interface 170 is connected to the third interface 210 of the mobile communication terminal 200 in a state where the first interface 160 is not connected to an external charging device (e.g., a travel adapter, a USB charging device), the controller 110 switches off the electric power supply switch 190 and the charging unit 140 and then turns of the boost converter 120. This is to charge the battery (not illustrated) of the mobile communication terminal 200 by the additional battery 130. To this end, the controller 110 further includes a second control terminal DC_on for outputting a control signal to control the boost converter 120.

When the controller 110 detects that the first interface 160 is connected to an external charging device 300 while the battery of the mobile communication terminal 200 is being charged via the additional battery 130, the controller 110 turns off the boost converter 120. After a period of time elapses, the controller 110 can resume turning on the electric power supply switch 190. This is to allow the mobile communication terminal 200 to re-recognize a type of external charging device 300. That is, this is to prevent a USB charging device from being overloaded. While the mobile communication terminal 200 is charging the battery (not illustrated) based on a first reference, although the USB charging device is connected to the first interface 160, the mobile communication terminal 200 does not recognize the connection of the USB charging device and continues to charge the battery based on the first reference. This causes the overload of the USB charging device.

When the portable charging apparatus 100 is connected to the mobile communication terminal 200 and the first interface 160 is connected to the external charging device 300, the controller 110 turns on the electric power supply switch 190 and disenables the charging unit 140 and the boost converter 120, thereby charging the battery (not illustrated) of the mobile communication terminal 200 via the external charging device 300. When the battery of the mobile communication terminal 200 has been fully charged, the controller 110 turns off the electric power supply switch 190 and activates the charging unit 140, thereby charging the additional battery 130 via the external charging device 300. When the controller 110 determines that the voltage level of the battery of the mobile communication terminal 200 is lowered to a certain value while charging the additional battery 130, the controller 110 deactivates the charging unit 140 and turns on the electric power supply switch 190, thereby charging the battery of the mobile communication terminal 200.

The electric power supply switch 190 supplies or breaks the electric power, supplied to the mobile communication terminal 200 from the external charging device 300 connected to the first interface 160, under the control of the controller 110. The electric power supply switch 190 may be implemented with switching devices, for example, a Field Effect Transistor (FET), a Bipolar Junction Transistor (BJT), and the like. The electric power supply switch 190 is enabled under the control of the controller 110 when the battery of the mobile communication terminal 200 is charged via the external charging device 300 connected to the first interface 160 and disenabled when the additional battery 130 of the portable charging apparatus 100 is charged via the external charging device 300.

The boost converter 120 is enabled when the battery of the mobile communication terminal 200 is charged via the portable charging apparatus 100. The boost converter 120 can boost an input voltage to a preset level and then output it. That is, the boost converter 120 receives electric power from the additional battery 130, boosts the received voltage to a preset level (e.g., 5 V), and outputs it. The boost converter 120 transfers the boosted output to the VDD terminal of the second interface 170 connected to a mobile communication charging unit (not illustrated) of the mobile communication terminal 200, thereby charging the battery of the mobile communication terminal 200. In an exemplary implementation, the boost converter 120 may be implemented with a Direct Current (DC)-DC up converter.

The additional battery 130 may be implemented with secondary cells that may include various chemicals, such as nickel cells, cadmium cells, nickel-cadmium cells, chemical cells, and the like. The additional battery 130 can be fully charged via the charging unit 140. When the portable charging apparatus 100 is connected to the mobile communication terminal 200 in a state where the first interface 160 is not connected to an external charging device 300, the additional battery 130 can supply electric power to the boost converter 120, thereby charging the battery of the mobile communication terminal 200.

Figure 3A:
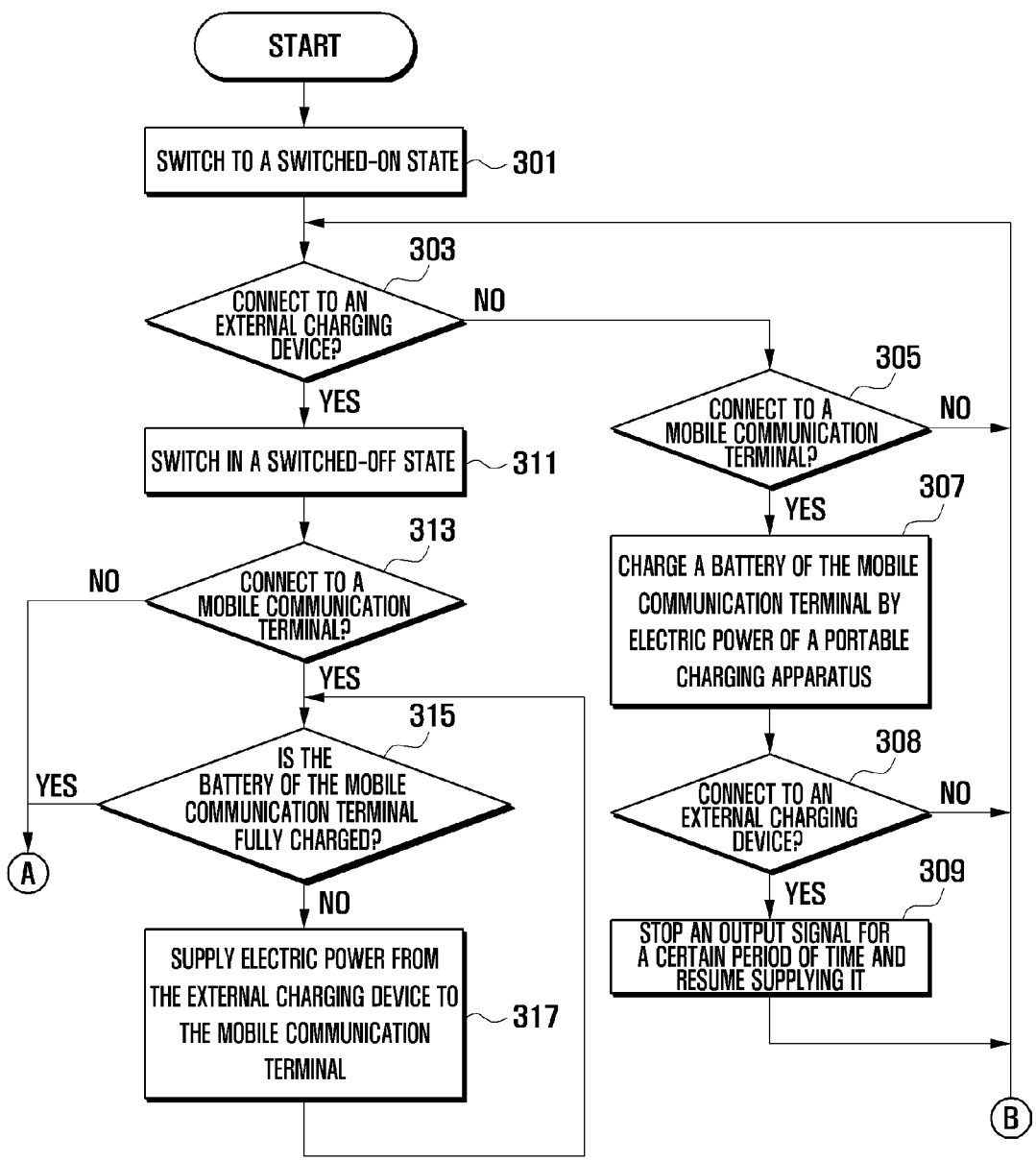
FIGS. 3A and 3B illustrate a flowchart of a charging method of a portable charging apparatus, according to an exemplary embodiment of the present invention.
Figure 3B:
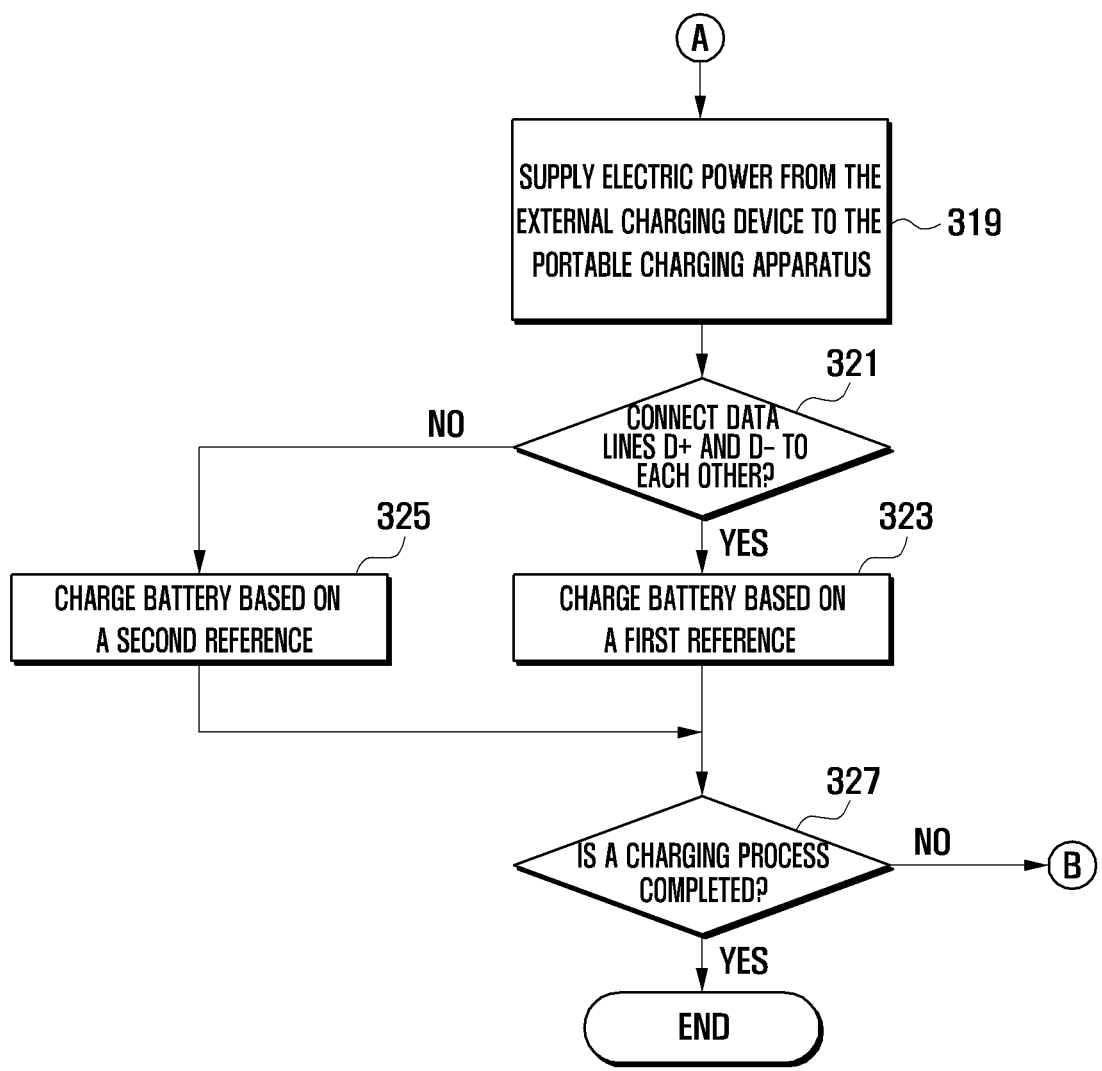

FIGS. 3A and 3B illustrate a flowchart of a charging method of a portable charging apparatus, according to an exemplary embodiment of the present invention.

Referring to FIGS. 3A and 3B, the switch 150 of the portable charging apparatus 100 is switched on at step 301. The switch 150 is located between the positive data line D+ and the negative data line D− of the first interface 160. The switch 150 is switched on as long as the control terminal c does not receive a signal equal to or greater than a certain level (e.g., 1 V).

The controller 110 determines whether the first interface 160 is connected to an external charging device 300 (e.g., a travel adapter, a USB charging device, and the like) at step 303. To this end, the controller 110 includes a detection terminal det for detecting an output voltage of the external charging device 300. If the controller 110 determines that the first interface 160 is not connected to an external charging device 300 at step 303, the controller 110 determines whether the portable charging apparatus 100 is connected to the mobile communication terminal 200 at step 305. If the controller 110 determines that the portable charging apparatus 100 is not connected to the mobile communication terminal 200 at step 305, the controller 110 returns to step 303. On the contrary, if the controller 110 determines that the portable charging apparatus 100 is connected to the mobile communication terminal 200 at step 305, the controller 110 charges the battery of the mobile communication terminal 200 using the electric power of the additional battery 130 at step 307. To this end, the controller 110 turns off the electric power supply switch 190 and the charging unit 140, and turns on the boost converter 120. That is, the controller 110 controls the boost converter 120 to boost the voltage of the additional battery 130 to a preset level (e.g., 5 V) and then supplies the boosted voltage to the mobile communication charging unit of the mobile communication terminal 200 via the VDD terminal of the second interface 170. Since the switch 150 has connected the positive data line D+ and the negative data line D− to each other, the mobile communication terminal 200 can charge the battery based on a first reference. As such, when the portable charging apparatus 100 is not connected to an external charging device 300, the switch 150 can be switched on and thus reduce the charging time of the battery of the mobile communication terminal 200. In addition, the problem where the mobile communication terminal 200 incorrectly determines that the portable charging apparatus 100 is a USB device can be prevented so that the mobile communication terminal 200 does not enter a sleep mode and continues to consume the battery of the mobile communication terminal 200 and the additional battery of the portable charging apparatus 100.

After charging the battery of the mobile communication terminal 200 at step 307, the controller 110 determines whether the portable charging apparatus 100 is connected to the external charging device 300 at step 308. When the controller 110 determines that the portable charging apparatus 100 is not connected to the external charging device 300 at step 308, the controller 110 returns to and proceeds with step 303. On the contrary, when the controller 110 determines that the portable charging apparatus 100 is connected to the external charging device 300 at step 308, the controller 110 temporarily stops supplying electric power to the mobile communication terminal 200 via the second interface 170 and then resumes supplying electric power at step 309. During this process, since the portable charging apparatus 100 is still connected to the external charging device 300, the switch 150 is switched off.

When the mobile communication terminal 200 receives an interrupt signal that is created due to the connection of the external charging device 300, the mobile communication terminal 200 recognizes the type of external charging device 300 and does not perform a process of re-recognizing the type of external charging device 300 until it receives an interrupt signal again. That is, although the portable charging apparatus 100 is connected to a USB charging device while the portable charging apparatus 100 is charging the battery of the mobile communication terminal 200 based on the first reference, the mobile communication terminal 200 does not re-recognize the type of external charging device, thereby allowing the battery to continue being charged based on the first reference. In this case, since the mobile communication terminal 200 requests charging current exceeding the maximum charging current of the USB charging device from USB charging device, the USB charging device is overloaded. In order to address this problem, when the controller 110 determines that the portable charging apparatus 100 is connected to an external charging device 300 while the battery of the mobile communication terminal 200 is being charged via the additional battery 130, the controller 110 temporarily stops supplying electric power supplied to the mobile communication terminal 200 and then resumes supplying it, thereby allowing the mobile communication terminal 200 to re-recognize the type of external charging device 300.

Meanwhile, when the controller 110 determines that the first interface 160 is connected to an external charging device 300 at step 303, the controller 110 switches off the switch 150 at step 311, and determines whether the portable charging apparatus 100 is connected to the mobile communication terminal 200 at step 313. When the controller 110 determines that the portable charging apparatus 100 is connected to the mobile communication terminal 200 at step 313, the controller 110 determines whether the battery of the mobile communication terminal 200 is fully charged at step 315. To do this, the controller 110 detects the level of voltage or current in the battery of the mobile communication terminal 200. For example, when the controller 110 determines that the voltage of the battery of the mobile communication terminal 200 is approximately 4.2 V, the controller 110 concludes that the battery is fully charged. Alternatively, when the controller 110 determines that the current is equal to or less than a preset value (e.g., 10 mA), set as to flow when the battery of the mobile communication terminal 200 is fully charged, the controller 110 concludes that the battery is fully charged.

When the controller 110 determines that the battery of the mobile communication terminal 200 is fully charged at step 315, the controller 110 charges the additional battery 130 of the portable charging apparatus 100 via the external charging device 300 at step 319, which is described in more detail below.

On the contrary, when the controller 110 determines that the battery of the mobile communication terminal 200 is not fully charged at step 315, the controller 110 supplies electric power from the external charging device 300 to the mobile communication charging unit (not illustrated) of the mobile communication terminal 200 at step 317. To this end, the controller 110 turns on the electric power supply switch 190 and turns off the boost converter 120 and the charging unit 140. During this process, the mobile communication terminal 200 determines whether two data lines D+ and D− are connected to each other and charges the battery at a corresponding current based on the determination.

Meanwhile, when the controller 110 determines that the portable charging apparatus 100 is not connected to the mobile communication terminal 200 at step 313 or that the battery of the mobile communication terminal 200 is fully charged at step 315, the controller 110 supplies electric power from the external charging device 300 to the charging unit 140 of the portable charging apparatus 100 at step 319. To this end, the controller 110 turns off the electric power supply switch 190 and the boost converter 120, and turns on the charging unit 140.

Thereafter, the controller 110 determines whether positive data line D+ and negative data line D− are connected to each other at step 321. When the controller 110 determines that positive data line D+ and negative data line D− are connected to each other at step 321, the controller 110 controls the charging unit 140 to charge the additional battery 130 based on the first reference (e.g., 700 mA) at step 323. On the contrary, when the controller 110 determines that positive data line D+ and negative data line D− are not connected to each other at step 321, the controller 110 controls the charging unit 140 to charge the additional battery 130 based on the second reference (e.g., 500 mA) at step 325. It is preferable that the second reference is equal to or less than the maximum charging current according to the USB standard, for example 500 mA. Meanwhile, when the portable charging apparatus 100 is designed in such a manner as to allow the additional battery 130 to be charged with a certain level of charging current irrespective of the types of external charging devices, steps 321 to 325 may be omitted according to an exemplary embodiment of the present invention.

Thereafter, the controller 110 determines whether the battery of the mobile communication terminal 200 and the additional battery 130 have been completely charged at step 327.

When the controller 110 determines that that the battery of the mobile communication terminal 200 and the additional battery 130 have been completely charged at step 327, the controller 110 terminates the charging process. Otherwise, the controller 110 returns to step 303.

FIG. 4 illustrates a flowchart of a charging method of a charging system, according to an exemplary embodiment of the present invention.

FIG. 4 is described based on a case where the portable charging apparatus 100 is connected to a mobile communication terminal 200 and to an external charging device 300.

Referring to FIGS. 2 and 4, the switch 150 of the portable charging apparatus 100 is switched on at step 401. Thereafter, the portable charging apparatus 100 may be connected to the mobile communication terminal 200 at step 403. The controller 110 disenables the charging unit 140 and the electric power supply switch 190 of the portable charging apparatus 100 and enables the boost converter 120 so that the voltage of the additional battery 130 can be increased to a preset level (e.g., 5 V) and provide the increased voltage to the mobile communication terminal 200 via the VDD terminal of the second interface 170. When the portable charging apparatus 100 is connected to the mobile communication terminal 200, the mobile communication terminal 200 can control the mobile communication charging unit (not illustrated) to charge the battery (not illustrated) based on the first reference (e.g., 700 mA) at step 405. Since the switch 150 is switched on, the data lines D+ and D− are connected to each other.

Thereafter, the external charging device 300 is connected to the first interface 160 of the portable charging apparatus 100 at step 407. In this case, the external device sensor 180 of the portable charging apparatus 100 can transfers a detected signal to the control terminal c of the switch 150 and the detection terminal det of the controller 110 at step 409. The switch 150 is switched off according to the sensed signal at step 411.

The controller 110 temporarily stops supplying electric power supplied to the mobile communication terminal 200 for a certain period of time at step 413, and then resumes supplying electric power to the VDD terminal of the second interface 170 at step 415. When the controller 110 determines that the external charging device 300 is connected to the portable charging apparatus 100 while the battery of the mobile communication terminal 200 is being charged via the additional battery 130, the controller 110 disenables the boost converter 120. After a certain period of time elapses, the controller 110 turns on the electric power supply switch 190 to supply electric power from the external charging device 300 to the mobile communication terminal 200.

When the mobile communication terminal 200 receives electric power from the external charging device 300, the mobile communication terminal 200 re-recognizes the type of external charging device 300 at step 417, and then controls the mobile communication charging unit (not illustrated) to charge the battery (not illustrated) at a preset charging current corresponding to the recognized type of external charging device 300 at step 419. The mobile communication terminal 200 can recognize the type of external charging device 300 by determining whether data lines D+ and D− are connected to each other. For example, when data lines D+ and D− are connected to each other, the mobile communication terminal 200 concludes that a travel adapter is connected thereto and then sets the maximum charging current of the mobile communication charging unit (not illustrated) to a first reference (e.g., 700 mA). On the contrary, when data lines D+ and D− are not connected to each other, the mobile communication terminal 200 concludes that a USB charging device is connected thereto and then sets the maximum charging current of the mobile communication charging unit (not illustrated) to a second reference (e.g., 500 mA). Meanwhile, it should be understood that the first and second references are not limited to 700 mA and 500 mA respectively, but may be set to various values according to the manufacturers' designs. It is preferable that the second reference is set to a value that does not exceed the maximum current defined in the USB standard, for example, 500 mA.

As described above, the portable charging apparatus 100 is configured to include a switch 150 that is switched on/off according to whether the portable charging apparatus 100 is connected to an external charging device 300. When the portable charging apparatus 100 is connected to only the mobile communication terminal 200, without being connected to an external charging device 300, the portable charging apparatus 100 can control the switch 150 to be in a switched-on state. In this case, the mobile communication terminal 200 can recognize the portable charging apparatus 100 as a travel adapter. Therefore, the battery (not illustrated) of the mobile communication terminal 200 can be charged based on the first reference that is greater than a value that the battery is charged via the conventional portable charging apparatus, thereby reducing the battery charging time. In addition, the problem in which the mobile communication terminal 200 recognizing that the portable charging apparatus 100 is a USB device can be prevented so that the mobile communication terminal 200 does not enter a sleep mode and thus continues to consume the battery of the mobile communication terminal 200 and the additional battery of the portable charging apparatus 100.

Meanwhile, when the portable charging apparatus 100 is connected to an external charging device 300 in a state where the battery of the mobile communication terminal 200 is being charged via the portable charging apparatus 100, the mobile communication terminal 200 can re-recognize the type of external charging device 300. To this end, when the first interface 160 is connected to an external charging device 300 while the battery of the mobile communication terminal 200 is being charged using electric power of the additional battery 130, the portable charging apparatus 100 temporarily stops the electric power supplied to the battery of mobile communication terminal 200 and then resumed supplying it. This is because it is designed so that the mobile communication terminal 200 can re-recognize the type of external charging device 300 only if an interrupt signal is created according to the input of an electric power signal. As such, when the portable charging apparatus 100 is connected to an external charging device 300, the mobile communication terminal 200 can re-recognize the type of external charging device 300, thereby preventing the USB charging device from being overloaded. A description regarding the overload of the USB charging device has been described above.

As described above, the charging method and apparatus according to an exemplary embodiment of the present invention can prevent a mobile communication terminal from determining that a portable charging apparatus connected thereto is a USB charging device and accordingly the mobile communication terminal cannot enter a sleep mode and thus continues to consume the electric battery power. The portable charging apparatus adapted to the charging method according to an exemplary embodiment of the present invention can relatively rapidly charge the battery of a mobile communication terminal. In addition, the charging method and apparatus can prevent an overload of a USB charging device when the USB charging device is connected to a portable charging apparatus while the mobile communication terminal is charging the battery via the portable charging apparatus.

As described above, the portable charging apparatus, charging method, and charging system, according to the an exemplary embodiment of the present invention, may be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with exemplary embodiments of the present invention or may be software well-known to the ordinary person skilled in the art.

The computer-readable recoding media includes hardware systems for storing and conducting program commands. Examples of the hardware systems are magnetic media such as a hard disk, floppy disk, a magnetic tape, optical media such as Compact Disc Read-Only Memory (CD-ROM) and Digital Video Disc (DVD), Magneto-Optical Media, such as floptical disk, ROM, Random-Access Memory (RAM), flash memory, and the like. The program commands include assembly language or machine code complied by a complier and a higher level language interpreted by an interpreter. The hardware systems may be implemented with at least one software module to comply with the exemplary embodiments of the present invention.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A charging system, the system comprising:
    an external charging device with a Universal Serial Bus (USB) interface, for supplying electric power to charge a battery;
    a portable charging apparatus comprising a first interface connected to the external charging device, a second interface connected to a mobile communication terminal, and a switch for connecting or for disconnecting the data lines according to whether the portable charging apparatus is connected to the external charging device, wherein the switch is disposed between data lines for USB communication; and
    a mobile communication terminal, connected to the second interface, for charging the battery via at least one of the external charging device and the portable charging apparatus.

2. The system of claim 1, wherein the mobile communication terminal charges the battery at different charging currents according to whether the data lines are connected to each other.

3. The system of claim 1, wherein the portable charging apparatus switches off the switch when the first interface is connected to the external charging device, and switches on the switch when the first interface is not connected to the external charging device.

4. The system of claim 1, wherein, when the portable charging apparatus detects a connection of the external charging device while the battery of the mobile communication terminal is being charged via an additional battery of the portable charging apparatus, the portable charging apparatus disenables a boost converter for receiving a voltage of the additional battery, for boosting the received voltage to a preset level, and for outputting the boosted voltage, and enables, after a certain period of time elapses, an electric power supply switch for temporarily stopping the supply of the electric power from the external charging device to the mobile communication terminal or for resuming the supply of the electric power from the external charging device to the mobile communication terminal.

5. The system of claim 1, wherein the portable charging apparatus and the mobile communication terminal charge the battery at a charging current of a first reference when the data lines are connected to each other and at a charging current of a second reference when the data lines are not connected to each other.

6. A charging method of a portable charging apparatus comprising a first Universal Serial Bus (USB) interface connected to an external charging device, a second USB interface connected to a mobile communication terminal, and a switch located between data lines for USB communication, the method comprising:
    determining whether the portable charging apparatus is connected to the external charging device;
    switching on the switch when the portable charging apparatus is not connected to the external charging device, and determining whether the portable charging apparatus is connected to the mobile communication terminal; and
    supplying electric power from an additional battery of the portable charging apparatus to the mobile communication terminal when the portable charging apparatus is connected to the mobile communication terminal.

7. The method of claim 6, wherein the supply of the electric power from the additional battery to the mobile communication terminal comprises:
    disenabling an electric power supply switch for stopping the supply of the electric power or for supplying the electric power from the external charging device to the mobile communication terminal; and
    enabling a boost converter for receiving a voltage of the additional battery of the portable charging apparatus, for boosting the received voltage to a preset level, and for outputting the boosted voltage.

8. The method of claim 7, further comprising:
    disenabling the boost converter when the portable charging apparatus detects the connection of the external charging device while electric power of the additional battery is supplied to the mobile communication terminal;
    enabling, after a certain period of time elapses, the electric power supply switch; and
    supplying electric power from the external charging device to the mobile communication terminal.

9. The method of claim 6, further comprising:
    switching off the switch when the external charging device is connected to the portable charging apparatus;
    determining whether the mobile communication terminal is connected to the portable charging apparatus;
    determining, when the mobile communication terminal is connected to the portable charging apparatus, whether the battery of the mobile communication terminal is fully charged;
    supplying, when the battery of the mobile communication terminal is not fully charged, electric power from the external charging device to the mobile communication terminal, and charging the battery of the mobile communication terminal; and
    charging the additional battery using electric power of the external charging device, when the battery of the mobile communication terminal is fully charged or the mobile communication terminal is not connected to the portable charging apparatus.

10. The method of claim 9, wherein the charging of the battery of the mobile communication terminal comprises:

enabling an electric power supply switch for supplying electric power or for stopping the supply of the electric power from the external charging device to the mobile communication terminal; and disenabling a boost converter and a charging unit, wherein the boost converter receives a voltage of the additional battery, boosts the received voltage to a preset level, and outputs the boosted voltage, and the charging unit charges the additional battery.

11. The method of claim 9, wherein the charging of the additional battery comprises:

disenabling an electric power supply switch and a boost converter, wherein the electric power supply switch supplies the electric power or stops the supply of the electric power from the external charging device to the mobile communication terminal, and the boost converter receives a voltage of the additional battery, boosts the received voltage to a preset level, and outputs the boosted voltage; and enabling a charging unit for charging the additional battery.

12. The method of claim 11, wherein the enabling of the charging unit comprises:

recognizing a type of external charging device by determining whether data lines for USB communication are connected to each other; and charging the additional battery at a charging current set to the recognized type of external charging device.

13. A portable charging apparatus, the apparatus comprising:

a first Universal Serial Bus (USB) interface, connected to an external charging device;

a second USB interface, connected to a mobile communication terminal;

an additional battery for supplying electric power to the mobile communication terminal via the second USB interface;

a switch, located between data lines of the first USB interface, for connecting or for disconnecting the data lines;

an external device sensor for detecting the connection of the external charging device and for transmitting a detected signal of the connection of the external charging device to a control terminal of the switch, wherein the switch is switched off or switched on according to the detected signal;

a boost converter for receiving a voltage of the additional battery, for boosting the received voltage to a preset level and for outputting the boosted voltage;

a charging unit for charging the additional battery;

an electric power supply switch for supplying the electric power or for stopping the supply of the electric power from the external charging device to the mobile communication terminal; and a controller for supplying electric power from the additional battery to the mobile communication terminal by enabling the boost converter when the second USB interface is connected to the mobile communication terminal and the first USB interface is not connected to the external charging device, for supplying electric power from the external charging device to the mobile communication terminal when a battery of the mobile communication terminal is not fully charged and the first USB interface and the second USB interface are connected to the external charging device and the mobile communication terminal, respectively, and for charging the additional battery via the external charging device by enabling the charging unit when the first USB interface is connected to the external charging device and the second USB interface is not connected to the mobile communication terminal or when the battery of the mobile communication terminal is fully charged and the first interface and the second USB interface are connected to the external charging device and the mobile communication terminal, respectively, wherein the controller comprises a detection terminal to which the detected signal of the connection of the external charging device is input.

14. The apparatus of claim 13, wherein, when the controller detects the connection of the external charging device when electric power of the additional battery is being supplied to the mobile communication terminal, the controller disenables the boost converter and, after a period of time elapses, the controller enables the electric power supply switch.

15. The apparatus of claim 13, wherein the switch is switched on when the first USB interface is not connected to the external charging device and is switched off when the first USB interface is connected to the external charging device.

16. The apparatus of claim 13, wherein, when the charging unit is enabled, the controller recognizes a type of external charging device by determining whether the data lines are connected to each other and charges the additional battery at a charging current corresponding to the recognized type of external charging device.

17. The apparatus of claim 13, wherein the first USB interface and the second USB interface comprises micro USB interfaces.

* * * * *